May 31, 1938.   L. A. LAURSEN   2,118,817
APPARATUS FOR AND METHOD OF INSERTING WASHERS IN RUBBER HEELS
Filed Dec. 31, 1934
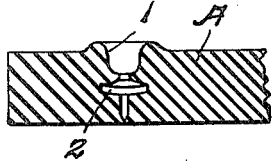
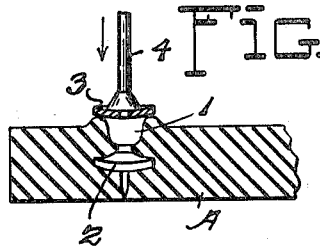
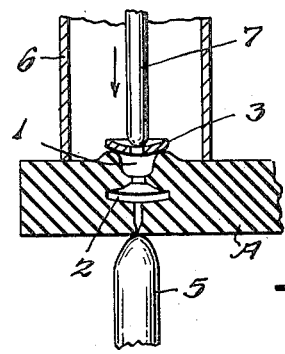
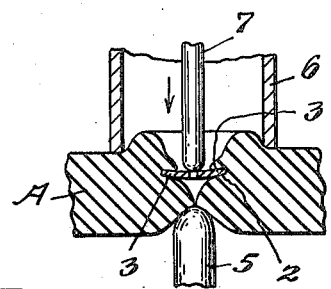
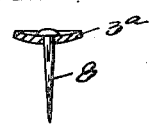
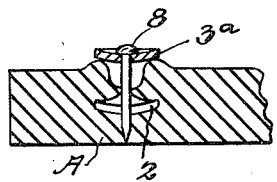
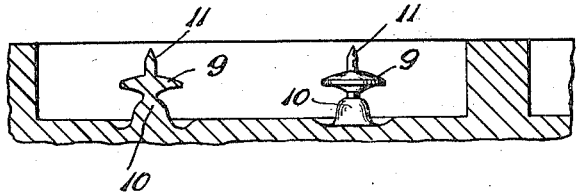
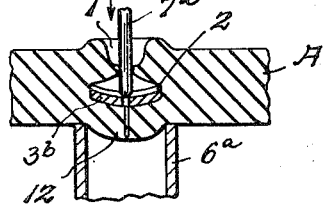
INVENTOR
LAURITS A. LAURSEN.
BY
ATTORNEYS Patented May 31, 1938

2,118,817

UNITED STATES PATENT OFFICE 2,118,817

APPARATUS FOR AND METHOD OF INSERTING WASHERS IN RUBBER HEELS

Laurits A. Laursen, Copley, Ohio

Application December 31, 1934, Serial No. 760,015

6 Claims. (Cl. 12—42)

This invention has to do with the art of making rubber heels. Such heels at the present time are formed with nail recesses or openings that are reinforced by the provision at each recess or opening of a metal reinforcing insert, or perforated washer, through the perforation of which the nail passes. The purpose of this reinforcing insert or washer is well known as preventing the tearing out or separation of the nail from the rubber or elastic heel or lift after the latter has been nailed in place upon the leather lift or heel portion of the shoe.

The common processes practiced in emplacing the reinforcing inserts or washers in the heel involve certain difficulties requiring that these elements be disposed upon the pins or lugs in the heel mold, in an accurate manner, preliminary to the placing of the "biscuit" in said mold for vulcanizing, during which vulcanizing the washers are embedded in the heel and become removable therewith after the curing of the "biscuit" at the completion of the vulcanizing operation. It is notable also that if a washer or washers constituting these reinforcing inserts happen to be displaced in the operations of inserting the "biscuits" into their mold cavities, or even in the curing operation, a defective heel will be produced. Generally speaking, therefore, the present method of putting the reinforcing inserts in the heel has the foregoing and other objections known to those versed in the art, and a primary object of this invention is to do away with the foregoing practice.

My invention may be characterized as including broadly the process of making rubber heels with the usual metal reinforcing inserts or washers for the nail openings or recesses, which consists in molding and vulcanizing the heel with the nail guiding recesses or openings therein, and also molding and curing the heel with the washer receiving cavities only, and subsequently causing the washers to be inserted into their receiving cavities after the curing or vulcanizing of the heel has been performed. So far as I am aware, I am the first to propose the pre-molding of the heel completely with the unfilled washer or reinforcing insert cavities, with the subsequent step of introducing the washers into such cavities.

My invention further includes an article of manufacture consisting of a vulcanized rubber heel formed with the washer receiving cavities ready for the introduction of the washers or reinforcing inserts at the proper time subsequent to the molding and vulcanizing operation.

My invention further includes processing steps which may consist of flexing or bending the vulcanized rubber heel with its washer receiving cavities for the purpose of facilitating the introduction of the washers into such cavities after the vulcanized heels have been removed from the molds in which they are formed and cured.

My invention further includes an article of manufacture consisting of a combined nail and washer or reinforcing insert applied thereto, the nail being susceptible, by reason of its cooperative mounting in relation to the washer or insert, of being used as a carrier for the washer or insert so that when the nail is driven in place to secure the rubber heel or lift to a shoe, said nail will carry the washer into a premolded cavity of the heel formed to receive same.

My invention includes in the process phase thereof the step of lubricating the recesses for receiving and guiding the nails whereby to facilitate slippage of the washer or metal insert in the operation of forcing the latter into the premolded cavity of the heel.

Exemplifications of the articles of manufacture which are included in the invention and the processes or methods of the invention are illustrated in the accompanying drawing, in which—

Figure 1 is a cross sectional view of a portion of a rubber heel showing its pre-molded condition with a washer receiving cavity ready to receive the washer to be placed in said cavity after the curing of the heel is completed.

Figure 2 is a sectional view illustrating the preliminary step of arranging the washer above the molded cavity which is to receive the same, a plunger being illustrated as the mechanical contrivance for forcing the washer downwardly so it may enter the said cavity.

Figure 3 shows a modification of the invention showing the process of introducing the washer into the cavity formed to receive same by distorting the heel in such a way as to enlarge the nail receiving opening to facilitate the entering of the washer into the cavity.

Figure 4 illustrates how the mandrel and the distortion producing lug cooperate in the action of forcing the washer home into its cavity, the step of Figure 4 following that of the preliminary placing of the parts shown in Figure 3.

Figure 5 shows how I may combine in one unit the heel attaching nail and washer so that the nail may be employed as the instrument for driving the washer down into the pre-molded washer receiving cavity.

Figure 6 is a view of a mold showing the nail recess or opening producing pins carrying the molding or forming elements which produce the washer receiving cavities surrounding the nail receiving recesses or openings.

Figure 7 is a view of the combination nail and washer.

Figure 8 is a view similar to Figure 4, showing a modified method of distending the washer recess useful in respect to ladies' rubber heels.

My invention is very simple and is readily understandable upon reference to Figure 1, wherein the heel is designated A, the nail receiving and guiding recesses or openings being indicated at 1. The said opening or recess 1 is formed with the surrounding washer or metal insert receiving cavity 2.

I may of course employ flat washers or inserts for the purposes of my invention, but the one illustrated is of the type which is umbrella-shaped in cross section, or, in other words, a concavo-convex disc with a central aperture, preferably, this aperture enabling the nail to readily pass through the washer when driven home to attach the rubber heel to a shoe. Figure 2 illustrates the same parts as are shown in Figure 1, excepting that the metal insert or washer 3 is located in its position preliminary to being forced into the cavity 2 by means of a plunger 4.

Now in Figures 3 and 4, I illustrate the process of facilitating distortion or bending of the rubber heel so as to spread or widen the recess 1 preliminary to forcing the washer 3 home into the cavity 2 where it will permanently remain. For the above purpose the heel may be placed upon one or more lugs or projections 5, the latter to be located below the nail guiding recess or opening, or recesses or openings, and by downward pressure of a hollow mandrel 6 the heel A will be distorted in the manner shown in Figure 4, and the pressure of the plunger 7 following slightly after the distortion performed by the mandrel 6 will force the washer 3 readily into the spread, wide-open mouth of the recess 1, and thereafter slide it into the cavity 2 in a self-evident manner.

As regards the illustrations of Figures 2, 3, and 4, I note that if desired, water, glycerine, or the like may be applied to the surface of the vulcanized heel A, especially at the point of contact of the washer 3 with the portions surrounding the recesses 1, and by doing this slippage of the washer into the recess 1 downward into the cavity 2 will be facilitated.

Now as regards Figures 5 and 7, I show how my washer 3a may be connected to the usual nail 8 by which the heel A will be secured in place. As shown in Figure 5, by driving downwardly on the head of the nail 8, said nail will act as a plunger to carry the insert or washer 3a into its receiving cavity 2 such as previously described. The nail 8 and washer 3a may be simply loosely connected with one another or they may be united to one another, this being immaterial so long as they act as a unit for the purposes set forth in carrying out the process illustrated by Figure 5.

The cavity 2 may be pre-molded in the operation of vulcanizing the heel A by securing the cavity molding members 9 to the pins 10, as seen in Figure 6. Of course, the members 9 will be fixed to the pins as by upsetting the heads of the pins at 11, and furthermore, the members 9 may be flat or umbrella-shaped according to the particular shape of the washers or metal inserts that are to be employed.

It is contemplated, according to my invention, to mold rubber heels after the usual method of molding and vulcanizing the same, placing the uncured rubber "biscuits" in the lower mold member having the heel molding cavities therein, and equipped with the usual means for the forming of the recesses or openings 1. Also, the heel cavity will be provided with means equivalent to the parts 9. The heels will thus be molded and cured after the customary way and the cavities 2 molded around the portions 1 in the manner previously set forth. When the heels A are removed from the molds they are fully cured or vulcanized and the spaces or cavities 2 are ready to receive the washers or metal inserts 3 or 3a as pointed out according to the foregoing description.

Figure 8 discloses another method of inserting the washer into the rubber heel A. As will be seen from the figure, a hollow mandrel 6a is placed underneath the heel subjacent the recess 1 and the washer 3b is forced into the cavity 2 by pressing the plunger 7a downwardly. The portion 12 of the rubber heel will be stretched thereby and forced somewhat into mandrel 6a and the cavity 2 will be sufficiently expanded to permit the proper seating of washer 3b therein.

This latter method of inserting the washer is used in connection with ladies' rubber heels which are vulcanized to an extent so as to become very hard, whereby the resiliency of the rubber is considerably reduced so that the previous methods of inserting the washer as described herein would not give satisfactory results.

Having thus described my invention, what I claim as new and desire to secure by Letters Patent of the United States, is—

1. The process of making rubber heels, which consists in vulcanizing a heel structure with nail receiving openings therein having washer receiving cavities surrounding the nail receiving openings and of much larger diameter than the latter, arranging the nail receiving openings and cavities in such relation that portions of the nail receiving openings form entrances to the cavities, disposing washers at the outer ends of the nail receiving openings adjacent to the wear surface of the heel, and subjecting these said washers to pressure to force them through the outer portions of the nail receiving openings until the washers enter the cavities surrounding said openings and are substantially covered by the rubber substance of the heel when so disposed in their cavities.

2. The process of producing rubber heels with washers surrounding the nail receiving openings thereof, which consists of curing the rubber heel, with nail receiving openings leading from the outer or wear side of the heel inwardly thereinto, at the same time forming washer receiving cavities surrounding the nail receiving openings and located between the outer and inner sides of the heel and of much larger diameter than the nail receiving openings, disposing washers at the outer side of the heel where the nail receiving openings are located, and driving said washers by pressure through the nail receiving openings to cause the washers to enter the cavities by spreading the substance of the heel at the outer portion of the nail receiving openings to cause the washers to pass into the cavities and permit the substance of the heel to contract over the washers to substantially cover the same.

3. Apparatus as described, including a projection on which a rubber heel may be impinged, a mandrel to press the heel against the projection so a nail receiving opening of the heel may be distended, and a plunger to force a reinforcing washer into the heel when said opening is distended.

4. Apparatus as described, including a hollow member above which a rubber heel equipped with a washer receiving opening may be disposed so that the washer receiving opening is above the hollow portion of said hollow member, and plunger means to force the reinforcing washer into the heel at said recess above the hollow member and to cause pressure downwardly upon the washer when partially received in the recess to distend the portion of the rubber heel below the recess sufficiently to permit the washer to freely enter and be fully received in the recess.

5. The process of making rubber heels with washers emplaced in embedded condition therein, which consists in supporting the heel so that the material thereof below the recess may be distended by pressure, and then forcing a washer into the recess of the heel by exerting pressure upon the washer to distend the material of the heel below the recess in such a manner as to enlarge the recess temporarily to facilitate the entering of the washer thereinto.

6. In apparatus for emplacing washers in an embedded condition in rubber heels having a nail-receiving opening and a washer-receiving cavity surrounding said nail-receiving opening, means for supporting the heel so that the nail-receiving opening and washer-receiving cavity may be distended by pressure, and means for forcing a washer into the nail-receiving opening whereby to distend the material of the heel so as to enlarge the nail-receiving opening and washer cavity, temporarily, until the washer seats in the cavity.

LAURITS A. LAURSEN.